United States Patent
Schneider et al.

(10) Patent No.: US 7,631,659 B2
(45) Date of Patent: Dec. 15, 2009

(54) FLUID TANK

(75) Inventors: Dieter Schneider, Filderstadt (DE); Guido Thiele, Brandenburg (DE)

(73) Assignee: Putzmeister Concrete Pumps GmbH, Aichtal (DE)

( * ) Notice: Subject to any disclaimer, the term of this patent is extended or adjusted under 35 U.S.C. 154(b) by 821 days.

(21) Appl. No.: 10/398,055

(22) PCT Filed: Sep. 6, 2001

(86) PCT No.: PCT/EP01/10241

§ 371 (c)(1), (2), (4) Date: Apr. 1, 2003

(87) PCT Pub. No.: WO02/28682

PCT Pub. Date: Apr. 11, 2002

(65) Prior Publication Data

US 2004/0094546 A1    May 20, 2004

(30) Foreign Application Priority Data

Oct. 6, 2000    (DE) .............................. 100 49 927

(51) Int. Cl.
*B60P 3/16* (2006.01)

(52) U.S. Cl. ...................... 137/571; 137/899

(58) Field of Classification Search ................ 137/899, 137/615, 571, 576, 574; 220/4.13, 4.14; 141/387
See application file for complete search history.

(56) References Cited

U.S. PATENT DOCUMENTS

| | | | |
|---|---|---|---|
| 845,804 A * | 3/1907 | Martin | 137/576 |
| 2,975,801 A * | 3/1961 | Kuypers et. al. | 137/576 |
| 3,648,730 A * | 3/1972 | Riester et al. | 137/572 |
| 4,185,750 A * | 1/1980 | Op den Camp | 220/501 |
| 4,428,145 A * | 1/1984 | Wheeler | 43/55 |
| 4,445,537 A * | 5/1984 | Athey et al. | 137/572 |
| 4,454,717 A * | 6/1984 | Wade et al. | 60/453 |
| 5,016,670 A * | 5/1991 | Sasaki et al. | 137/574 |
| 5,107,889 A * | 4/1992 | Sasaki et al. | 137/574 |
| 5,129,413 A * | 7/1992 | Puder et al. | 137/2 |
| 5,141,179 A * | 8/1992 | Gautier | 244/135 R |
| 5,186,200 A * | 2/1993 | Kimura et al. | 137/15.08 |
| 5,392,804 A * | 2/1995 | Kondo et al. | 137/202 |
| 5,749,485 A * | 5/1998 | Chiu | 220/4.12 |
| 6,123,216 A * | 9/2000 | Yokocho et al. | 220/564 |
| 6,338,420 B1 * | 1/2002 | Pachciarz et al. | 220/562 |
| 6,601,926 B2 * | 8/2003 | Tevis | 303/85 |
| 6,606,980 B1 * | 8/2003 | Walter | 123/509 |

(Continued)

FOREIGN PATENT DOCUMENTS

DE    196 23 844    1/1997

*Primary Examiner*—John Fox
(74) *Attorney, Agent, or Firm*—Patent Central LLC; Stephan A. Pendorf

(57) ABSTRACT

The invention relates to a fluid tank (20) comprising a base section (26) that is delimited by a tank base (22), an intermediate plane (24), which is situated at a distance above the tank base (22) and a domed section (28), which is situated above the intermediate plane (24) and communicates with the base section (26). In order to assemble the fluid tank even in an environment with a complex construction for example on the chassis of a mobile concrete pump, the inventive base section (26) and the domed section (28) are configured as separate hollow parts.

21 Claims, 9 Drawing Sheets

U.S. PATENT DOCUMENTS 6,688,331 B2 * 2/2004 Demersseman et al. ..... 137/571
6,913,040 B2 * 7/2005 Crossman et al. ........... 137/587
6,978,802 B2 * 12/2005 Hagano et al. .............. 137/574
2002/0000250 A1 * 1/2002 Evanovich et al. .......... 137/574

* cited by examiner

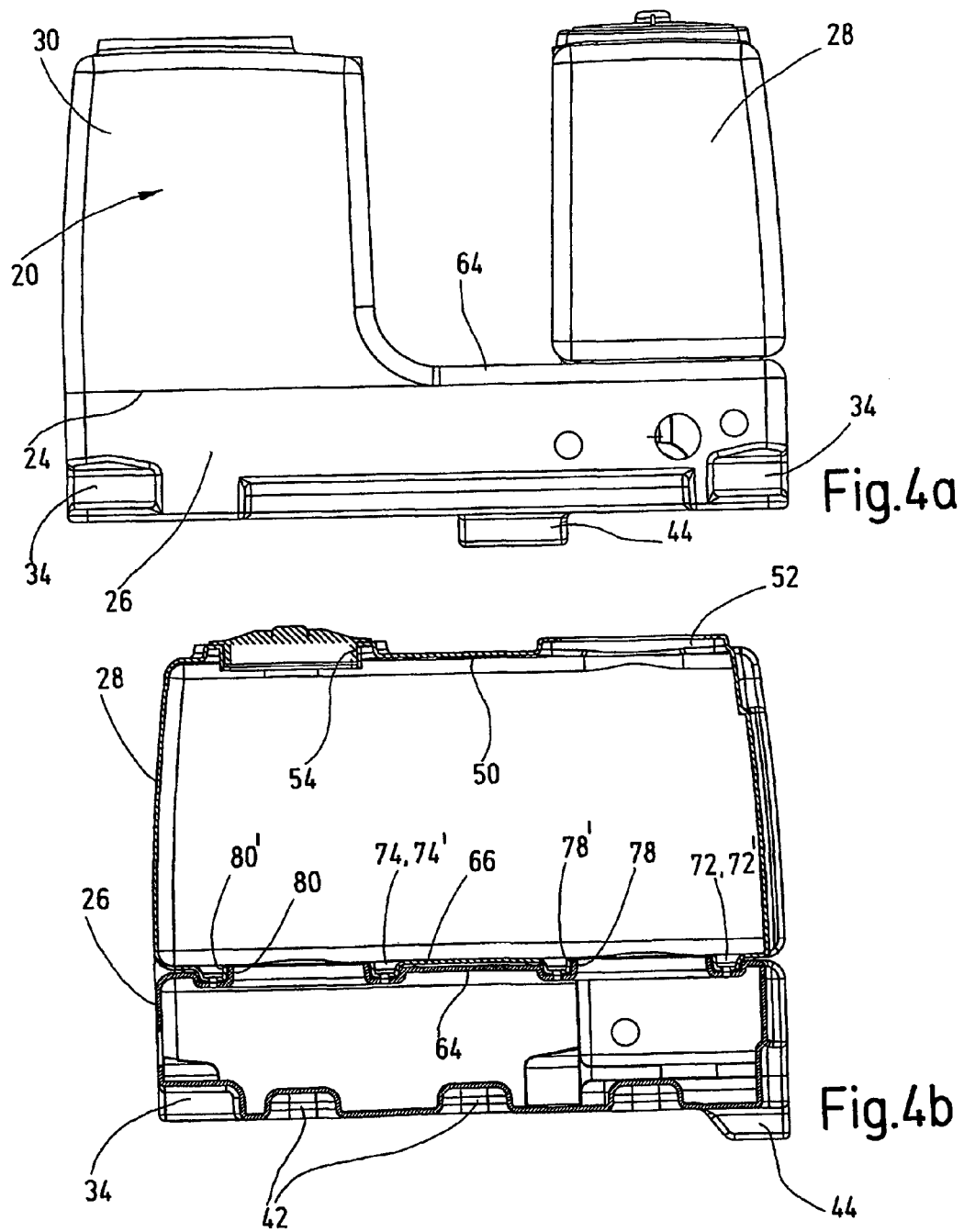

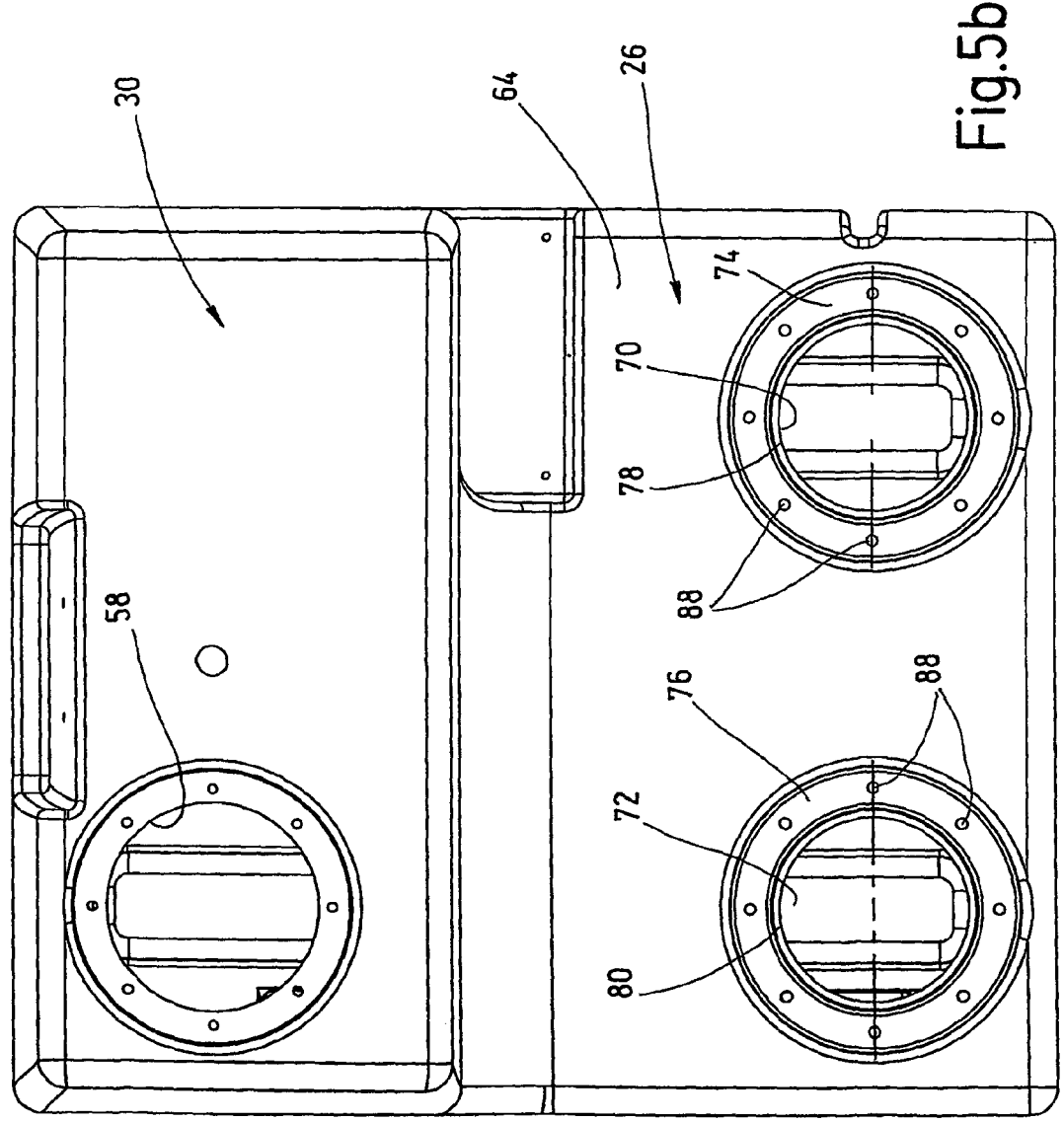

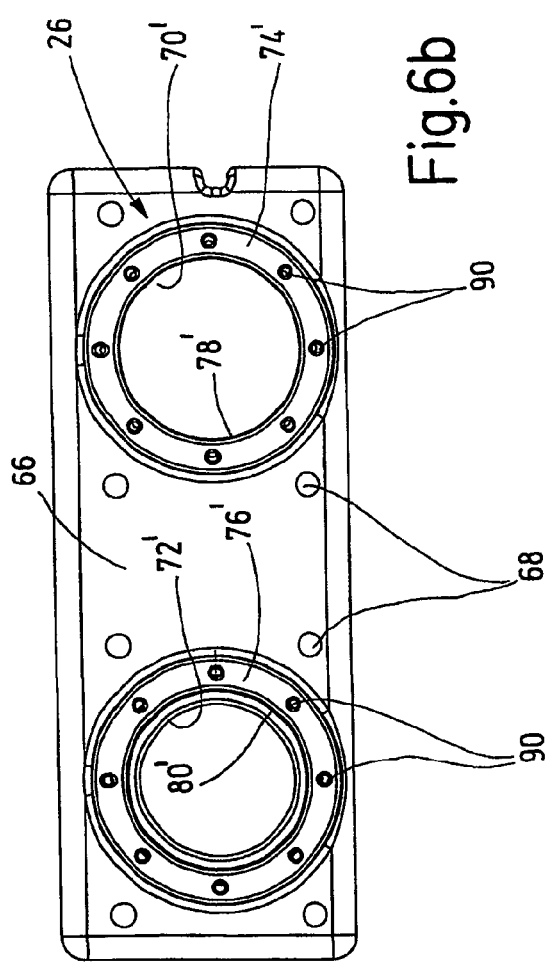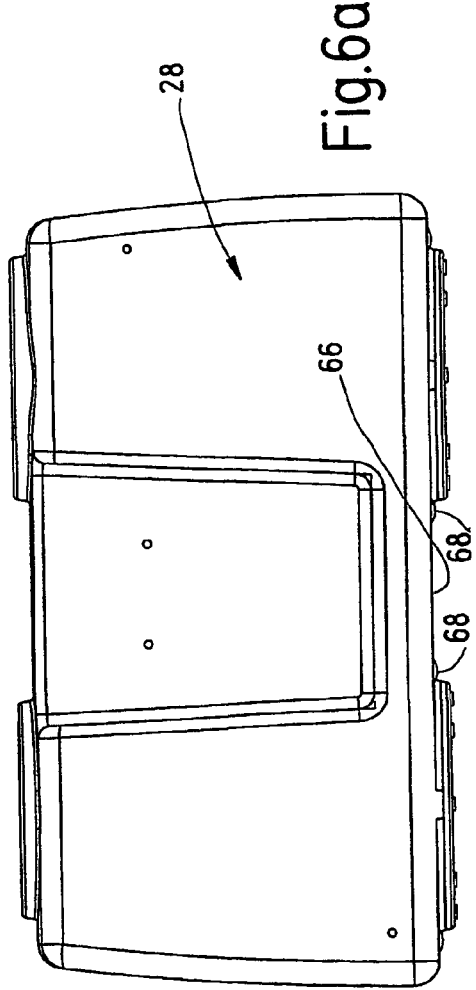

FLUID TANK

CROSS REFERENCE TO RELATED APPLICATION

This application is a national stage of PCT/EP01/10241 filed Sep. 6, 2001 and based upon DE 100 49 927.9 filed Oct. 6, 2000 under the International Convention.

BACKGROUND OF THE INVENTION

1. Field of the Invention

The invention concerns a fluid tank with a base part delimited by a tank floor and an intermediate plane situated a distance above the tank base, and with a dome part situated above the intermediate plane and in communication with the base part.

2. Description of the Related Art

In mobile concrete pumps it is conventional to take along a water tank. The water is used for example for cleaning the cement transfer tubes or the material feed basin. For this, relatively large tanks are necessary. The tanks, which have a capacity of 500 liters or more, are secured to available positions on the chassis of the concrete pump. In known concrete pumps the water tank is provided in the vicinity of the material feed basin and the thick material pump on the vehicle chassis. In this area as well as in other areas of the vehicle chassis there are frequently components of the pump and the placement boom which block assembly or mounting of the water tank. In order to provide fluid tanks with a sufficient volume nevertheless, the fluid tank is adapted to the existing structural components. By providing dome parts in addition to a base part it becomes possible to maintain large tank volumes while keeping free an intermediate area, for example, for the passage through of a concrete transfer tube. Taking this into consideration it is necessary on the other hand that complex assembly must be taken into consideration. Thus, in the above-mentioned cases, for the changing out of the tank first the concrete transfer tube must be removed. Further, the painting in the area of the tank is associated with difficulties. Even though the tank is usually painted along with the body, there nevertheless occur dead zones, which must be subsequently painted.

SUMMARY OF THE INVENTION

Beginning therewith it is the task of the invention to develop a fluid tank, which can be easily installed and removed even in an environment of complicated structures.

For solving this task the combination of characteristics set forth in Patent Claim 1 is proposed. Advantageous embodiments and further developments of the invention can be seen from the dependent claims.

The inventive solution is based therein, that the base part and the dome part are in the form of hollow parts separable from each other, which are not connected with each other until in place in position during the process of mounting. For this purpose the base part is at least partially covered over by a cover wall above the intermediate plane, while the dome part is provided on its lower side with a floor wall. The dome part is seatable with its floor wall upon the cover wall of the base part, whereby the cover wall of the base part and the floor wall of the dome part respectively exhibit at least one through-hole, which holes align pair wise with each other to form a through-opening and which are bordered by rims with form-fitting engaging coupling edges. The coupling edges which, are complementary to each other, and preferably grooved, furrowed or channeled are preferably integrally formed into the cover wall of the base part and the floor wall of the dome part. Preferably the coupling edges are limited towards the through hole by conical plug connections engaging in each other, while between the two coupling edges a seal ring of elastomeric material is provided.

A preferred embodiment of the invention envisions that the dome part and the base part are screwed together with each other in the area of the coupling edges. For this purpose boreholes are provided in the area of the coupling edges, spaced part from each other, pair wise aligning with each other, for the passage through of connecting screws, wherein additionally the boreholes of the base part can be provided or equipped supplementally with an internal threading for the engagement of the connecting screws. In addition, it is also possible to provide the sealing rings with boreholes around the circumference, spaced from each other, for the passage through of the connecting screws.

Since the dome part and the base part are screwed together in the inside of the fluid container, it is advantageous for simplification of assembly, when the dome part on its cover part lying opposite to the floor wall is provided with a through-hole aligned with the floor holes with a closeable assembly opening. The assembly opening is further suitable for the introduction of a water pump, which can be secured either in the assembly opening or in the area of the through hole on the fluid container.

For enlarging the tank volume it is proposed in accordance with the preferred embodiment of the invention that additionally at least one tower part is provided projecting above the base part and in communication with the dome part via the internal space of the base part, wherein the dome part and the tower part can be provided side-by-side with maintaining free of a preferably upwardly open intermediate space. Without reduction of the inventively achieved assembly simplification, the tower part can be connected with the base part as one piece.

According to a preferred embodiment of the invention the base part and/or the dome part is/are formed as a mold part, preferably as a rotation molded part, from plastic. The rotation mold part forming the base part is usually comprised of two mold part halves connected with each other into a single piece in the area of the intermediate plane in which the two form halves are joined to a single piece. With this means it is made possible to combine the lower mold half of the base part also with other upper mold halves. This is primarily of interest, when for varying applications the upper mold half can be variously combined with the same lower half. This results in a substantial reduction in the tooling costs and set-up time.

A further simplification of assembly is achieved thereby, that in the side walls of the base part, preferably in their edge areas, niches are formed-in, preferably from outside, which on the floor side define a plate. These assembly plates thereby usefully serve as securing plates, via which the fluid tank can-in certain cases with the intermediate positioning of a metal reinforcement-be secured to the vehicle chassis. A supplementally provided assembly plate can-in certain cases with use of a metallic adapter plate-be used or receiving a high pressure pump or a sedimentation basin.

Further reinforcement beads can be formed into the floor and/or the side walls of the base part or the dome part, such that a deformation or bowing of the tank under liquid pressure can be avoided even in the case that the construction is a thin wall.

Further, in the base part a downward directed bowing out of the floor can be formed in, serving as a drainage sump connection or fitting.

The inventive fluid tank is preferably used as water tank for mobile working machines, in particular for mobile concrete pumps, wherein in the later case a concrete delivery pipe can extend through between the free intermediate space between the dome part and the tower part. In this type of application, in the course of assembly, first the base part with the cover wall carrying part is pushed through below the concrete delivery pipe, seated on the vehicle chassis of the concrete pump and finally secured to the vehicle chassis. The dome part is subsequently seated with its floor wall upon the cover wall of the base part and screwed to the inside of the container for fluids in the area of the coupling edges.

BRIEF DESCRIPTION OF THE DRAWINGS

In the following the invention will be described in greater detail on the basis of the figures. There is shown FIG. 1 a side view of a mobile concrete pump with water tank;

FIG. 4a a side view of the water tank according to FIG. 2;

FIG. 4b a section along section line B-B of FIG. 4a;

FIG. 5a and b a side view and a top view of the base part according to FIG. 3a;

FIG. 6a and b a side view and a bottom view of the dome part according to FIG. 3b;

DETAILED DESCRIPTION OF THE INVENTION

Figure 1:
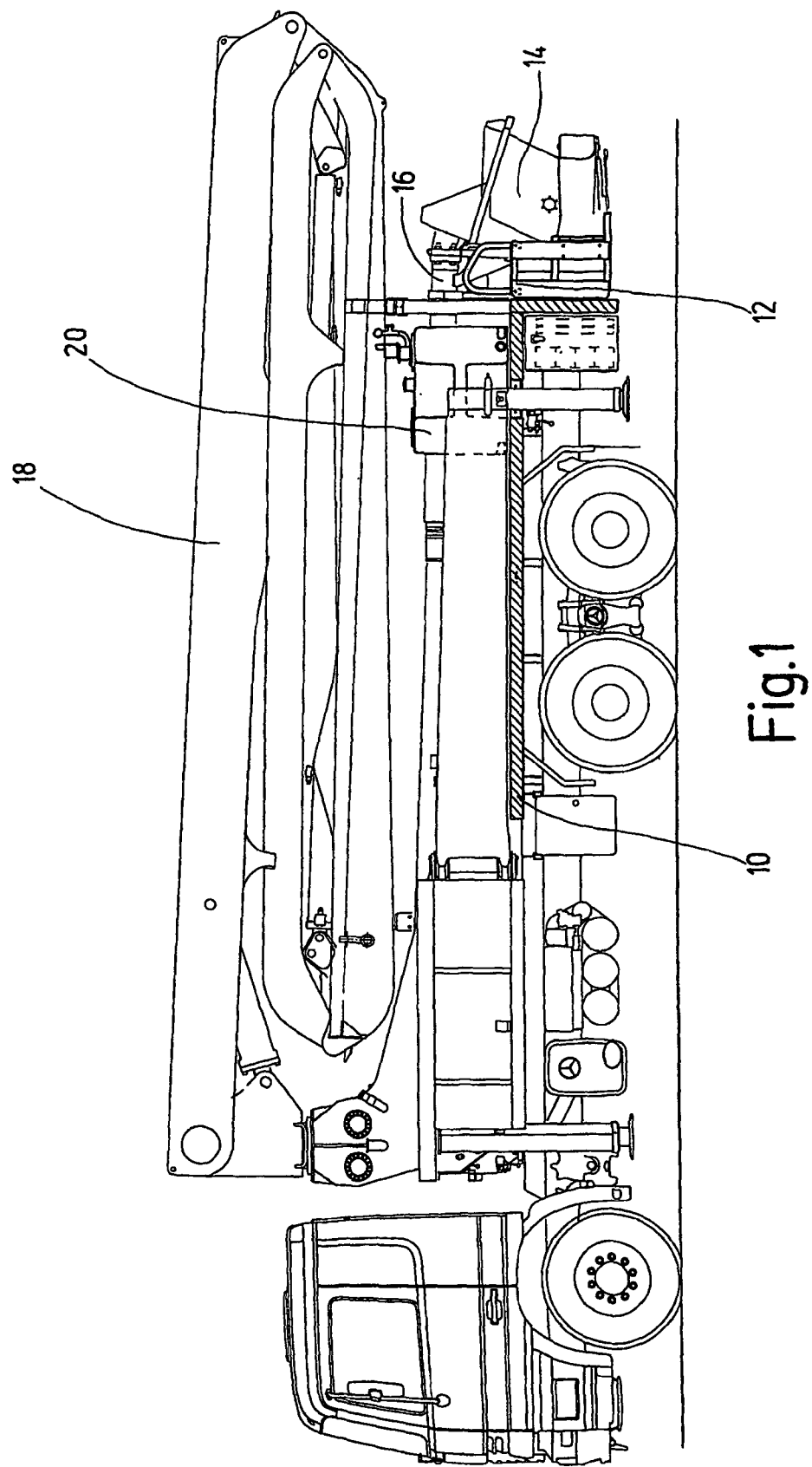
Figure 2:
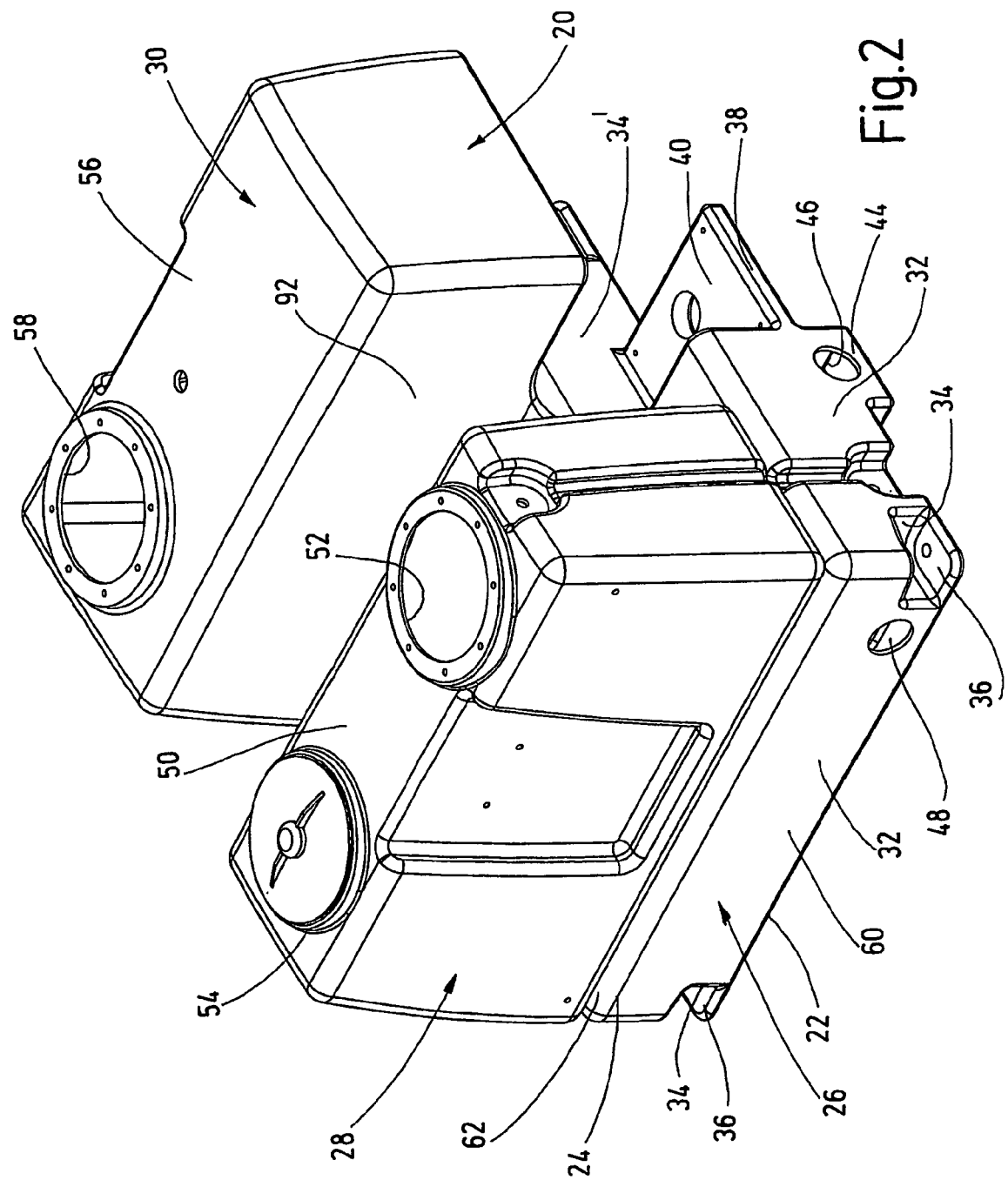
FIG. 2 a water tank according to FIG. 1 in enlarged perspective representation.
Figure 3A:
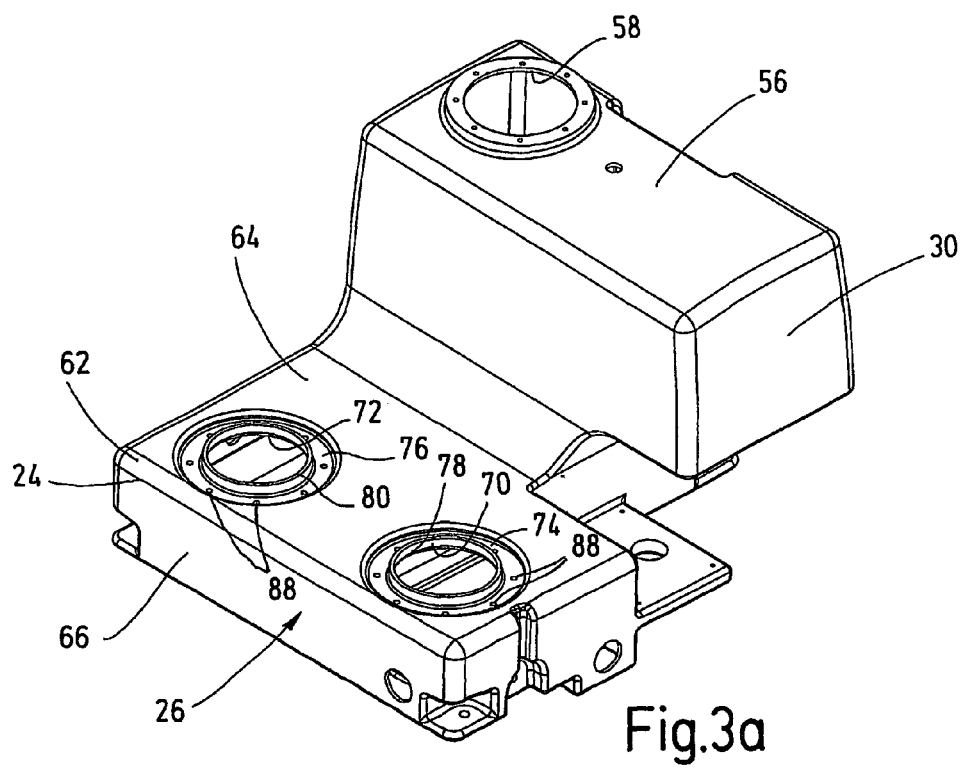
FIG. 3a and b the base part and the dome part of the water tank according to FIG. 2 in perspective representation.
Figure 3B:
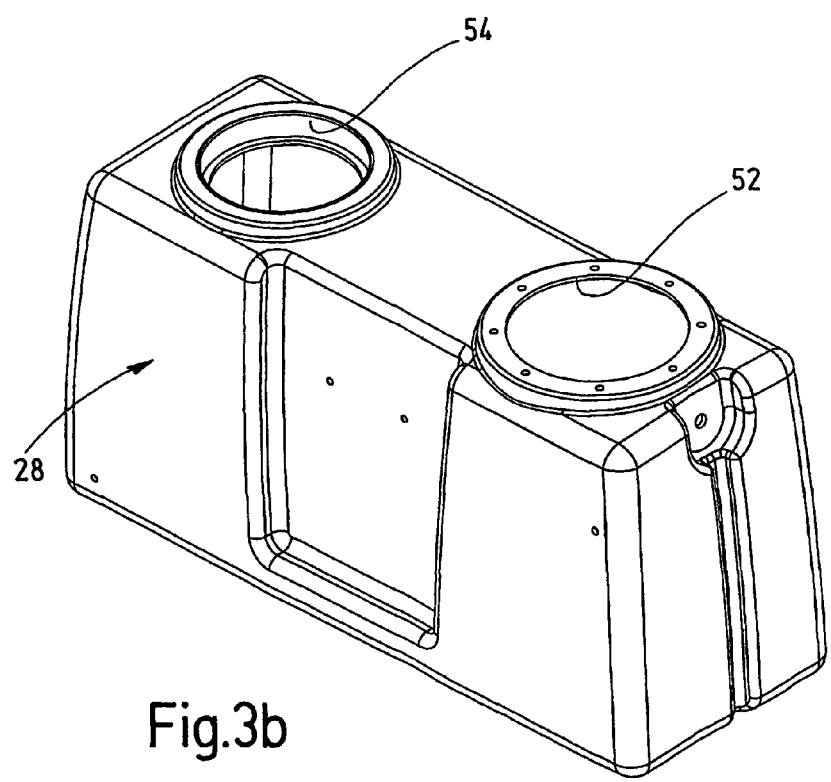
Figure 4C:
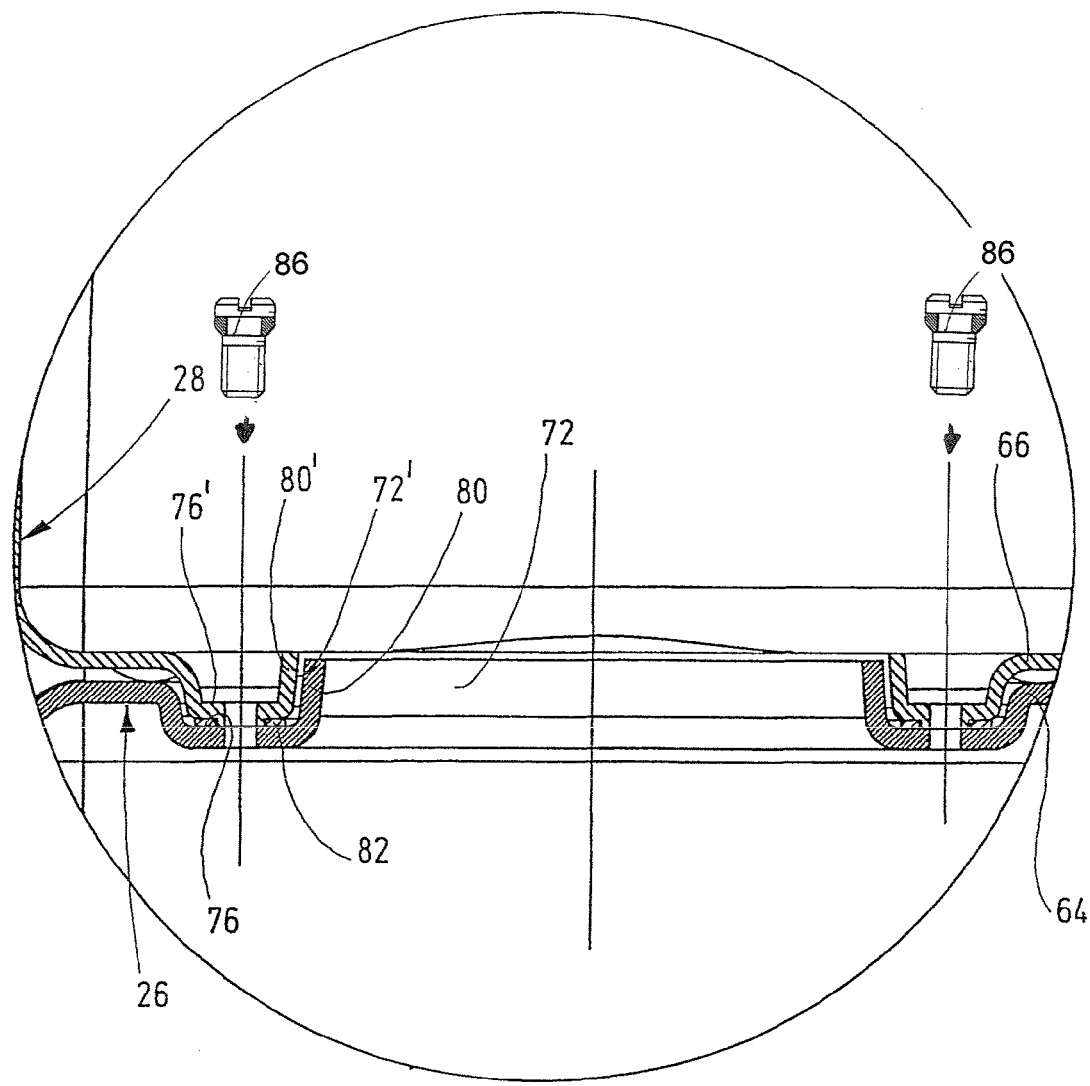
FIG. 4c an enlarged segment from FIG. 4b.

The mobile concrete pump shown in FIG. 1 is comprised essentially of a vehicle chassis 10, a thick material pump 12 provided upon the vehicle chassis, which on the suction side is in communication with the material feed basin 14 and on the pressure side is in communication with a concrete delivery pipe 16, and a placement boom 18 provided on the vehicle chassis 10, which carries a moveable part of the concrete delivery pipe 16, and is in the form of a foldable mast. After each pump process the material supply container 10 and the concrete delivery pipe 16 must be subjected to cleaning. For this, among other things, water is required. The cleaning water is brought along in a fluid tank 20, 20', which is provided on the vehicle chassis 10 in the vicinity of the thick material pump 12 and the material feed basin 14 and which has a capacity of approximately 500 liters.

Figure 5A:
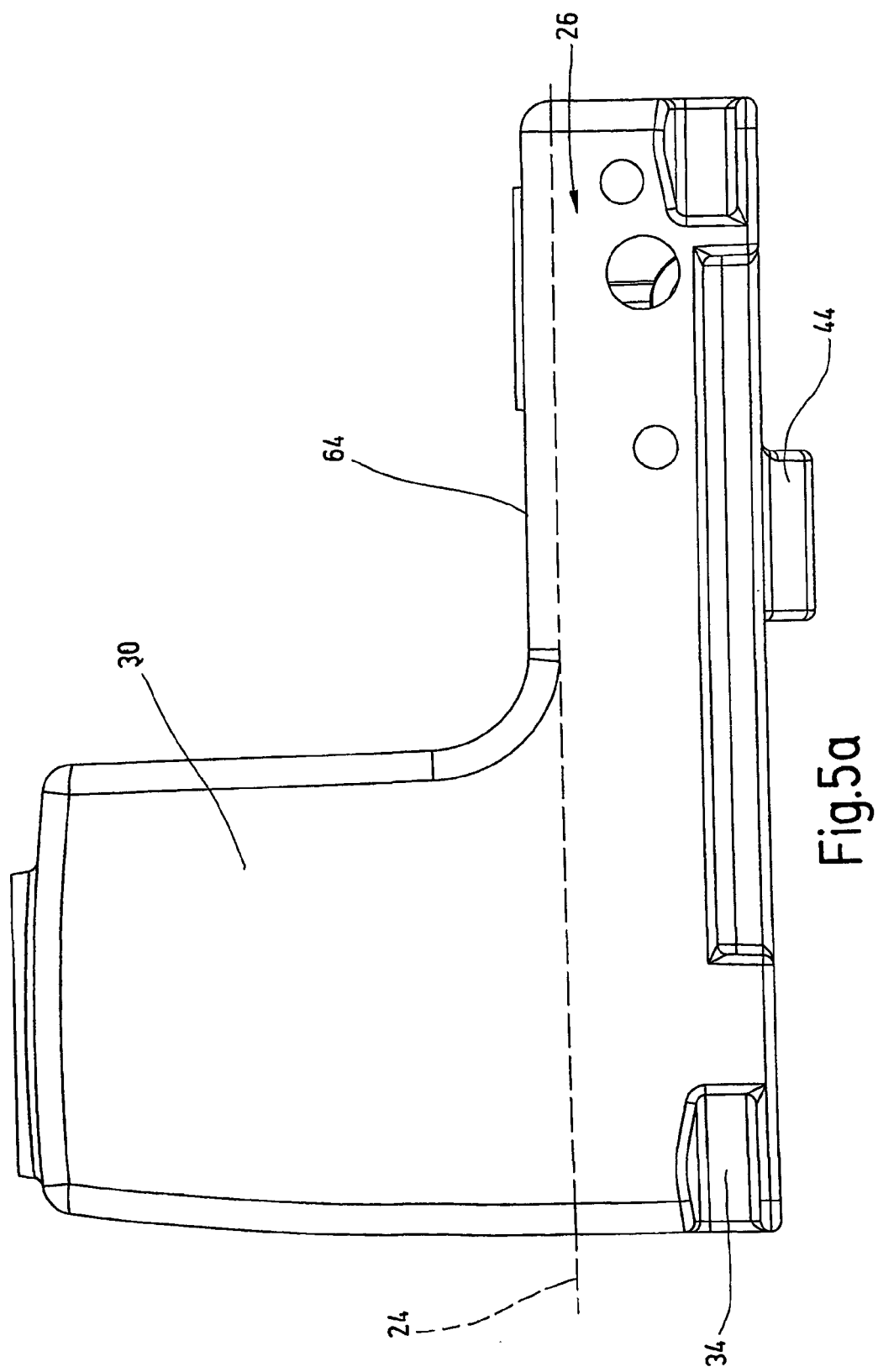

The fluid tank 20, 20' shown in the drawings has a base part 26 defined by a tank floor 22 and by a intermediate plane 24 spaced above the tank floor and serving as a form-separating plane (FIG. 5a), and respectively one dome part 28 and one tower part 30 located above the intermediate plane and communicating with the base part 26.

In the side walls 32 of the base part niches 34 are provided in the corner areas near the floor formed in from outside, which are bordered from the floor side by an integral assembly flange or plate 36. The assembly plates 36 serve for securing the fluid tank 20, 20' on the chassis. Further, an additional niche 34' with a formed in assembly plate 38 is located between the base part 26 and tower part 30, which with a metallic adapter plate 40 is intended for securing a not shown high pressure pump or a sedimentation container. In the area of the tank floor 22 deepening recesses 42 are formed into the base part 26, which in the case that the tank is filled, serve to prevent undesired bending of the tank floor 22. Further, the tank floor 22 is provided centrally with a drainage sump, as a downwardly directed bowing out 44, which includes an outlet opening 46 which can be fitted with a stand pipe or socket. In the lower area of the base part 26 an inlet opening 48 is provided in a side wall 32 which can be fitted with an inlet connection or pipe, via which the fluid container 20, 20' is fillable with water.

Figure 7:
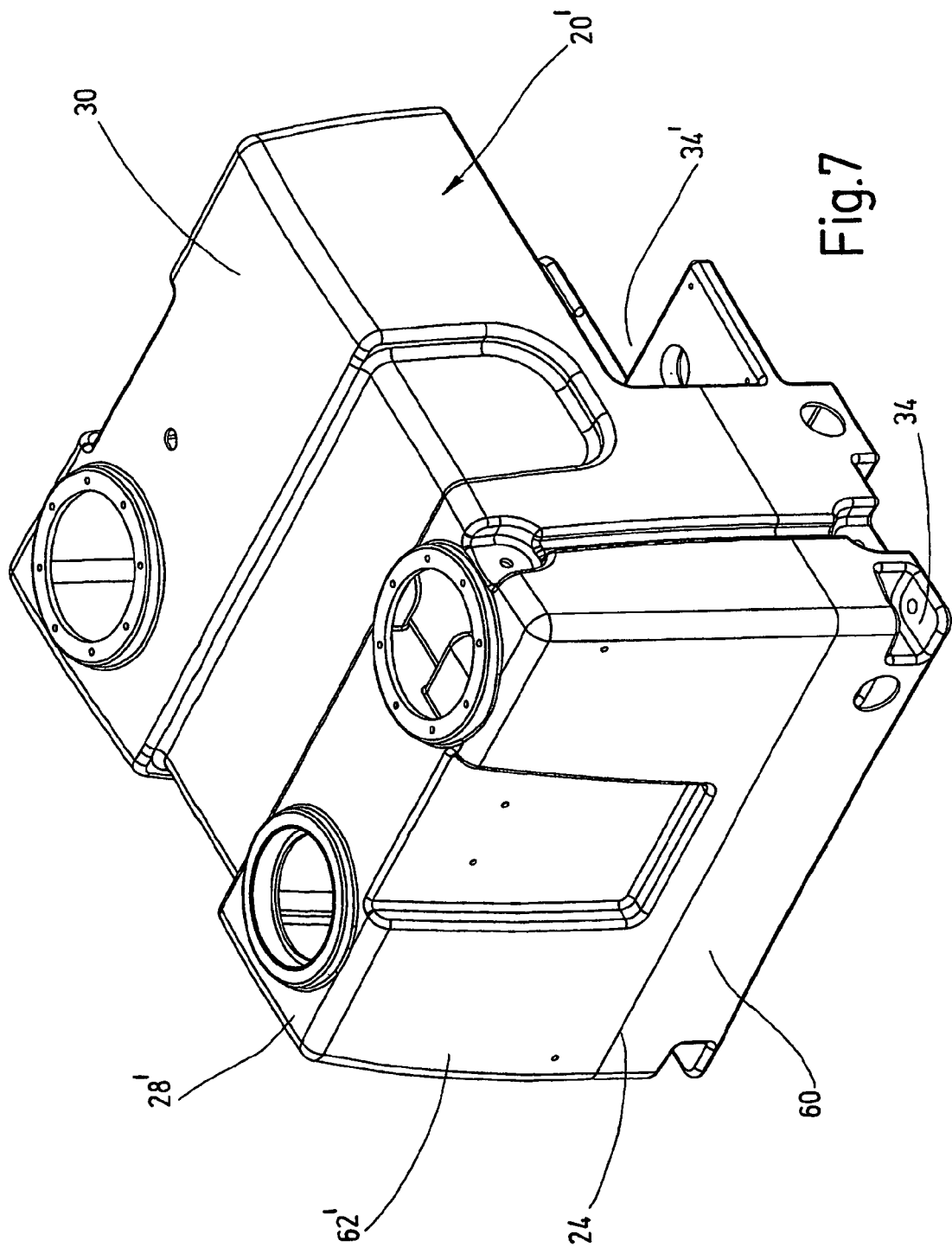
FIG. 7 a fluid tank modified compared to FIG. 2 in perspective representation.

On the top surface 50 of the dome part 28 there is located two lockable openings 52, 54 while in the lid surface 56 of the tower part 30 one opening 58 is provided. The tower part 30 is connected one-piece with the base part 26 both in the illustrative embodiment shown in FIGS. 2 through 6 as well as in the illustrative embodiment according to FIG. 7. A substantial difference between the two illustrated embodiments is comprised therein that in the fluid tank according to FIGS. 2 through 6 the base part 26 together with the tower part 30 on the one hand and the dome part 28 on the other hand are in the form of separate hollow parts, while in the case of FIG. 7 the dome part 28 is connected one piece or unitarily with the base part 26. In the first case the dome part 28 and the tower part 30 are provided spaced apart side-by-side with formation of an upwardly open intermediate space 92. The hollow parts are formed as rotation or spin mold parts of plastic. The rotation or spin mold part forming the base part is comprised therein essentially of two mold part halves-60 on the one hand and 62 or as the case may be 62' on the other hand-connected unitarily with each other in the area of the form separating intermediate plane 24. The floor sided mold part half 60 is identical in the two illustrative embodiments according to FIGS. 2 through 6 and FIG. 7, while the upper mold part halves 62 or as the case may be 62' of the two illustrative embodiments are different. For both embodiments there is only one single mold tool is necessary for the lower mold part half 60, which leads to a substantial saving in tooling and equipment.

The fluid tank 20 according to FIG. 2 through 6, which includes a dome part 28 removeable from the base part 26, can be mounted on the vehicle chassis even in complicated structures simply and without consideration of the assembly sequence. The base part 26 is for this purpose partially covered over above the intermediate plane 24 by a cover wall 64, while the dome part 28 on its lower side includes a floor wall 66. The dome part 28 is on its floor wall 66 provided with downwardly projecting concave [sic] beads or bumps 68, a multiplicity thereof spaced apart from each other and projecting downwards concavely [sic], via which they are supportable on the upper surface of the cover wall 64 when seated upon the base part 26. Further, the cover wall 64 of the base part 26 and the floor wall 66 of the dome part 28 respectively exhibit two through holes 70, 70' or as the case may be 72, 72', which align pair-wise with each other with formation of a common through opening and are bordered by form fitting in each other engaging coupling edges 74, 74' or as the case may be 76, 76'. The coupling edges 74, 76 or as the case may be 74', 76' in mating engagement complimentary to each other are formed into the cover wall 64 and into the floor wall 66 (FIG. 4c). They are bordered towards the through hole by conical in-each-other engaging connecting sockets 78, 80 or as the case may be 78', 80'. Between the associated coupling edges there is provided respectively one seal ring 82, 84 of elastomeric material. Further the dome part 28 and the base part 26 are screwed together by means of screws 86, which engage with each other through boreholes 88, 90 in the area of the cover wall 64 and the floor wall 66 extending through within the coupling edges. The boreholes 88 in the cover wall 64 of the base part 26 are therein provided with internal threadings for the screws 86. As can be seen from FIG. 4c, the screws 86 engage also in the appropriate through holes in the seal ring 82, 84. The assembly work during screwing together can occur through the openings 52, 54 in the lid surface 50 of the dome part 28.

In summary the following can be concluded: The invention relates to a fluid tank 20 comprising a base section 26 that is delimited by a tank base 22, an intermediate plane 24, which is situated at a distance above the tank base 22 and a domed section 28, which is situated above the intermediate plane 24 and communicates with the base section 26. In order to assemble the fluid tank even in an environment with a complex construction for example on the chassis of a mobile concrete pump, the inventive base section 26 and the domed section 28 are configured as separate hollow parts.

The invention claimed is:

1. A fluid tank with
a base section (26) defined by a tank floor (22) and an intermediate plane (24), situated above the tank floor (22) and
a domed section (28), situated above the intermediate plane (24) and communicating with the base section (26),
wherein the base section (26) and the dome section (28) are in the form of separate hollow sections,
wherein the base section is at least partially covered over by a cover (64) above the intermediate plane (24),
wherein the dome section (28) includes on its lower side a floor (66),
wherein the dome section (28) is seatable with its floor (66) upon the cover (64) of the base section (26),
wherein the cover (64) of the base section (26) and the floor (66) of the dome section (28) respectively are provided with at least one through hole (70, 70'; 72, 72') which pair-wise align with each other to form a through opening and which are bordered by coupling rims (74, 74'; 76, 76') engaging form-fitting in each other,
wherein said tank is adapted for use as a water tank for mobile concrete pumps, wherein a concrete delivery pipe (16) extends through a space (92) between the dome section (28) and the tower part (30) of the water tank, and
wherein the base section (26) with its cover (64) carrying part is pushed through below a concrete conveyance pipe (16) of a concrete pump mounted on a vehicle chassis (10) and is secured to the vehicle chassis, and that subsequently the dome section (28) is seated with its floor (66) upon the cover (64) of the base section (26) and is screwed thereto in the area of the coupling rims (74, 74', 76, 76') in the inside of the fluid container.

2. The fluid tank according to claim 1, wherein the complimentarily coupling rims (74, 76; 74', 76') adapted to mating engagement are channeled grooved, are formed into the cover (64) of the base section (26) and the dome section floor (66) of the dome section (28).

3. The fluid tank according to claim 2, wherein at least one of the base section part (26) and the dome section (28) are molded parts.

4. The fluid tank according to claim 3, wherein the mold part forming the base section (26) is comprised of two mold part halves (60; 62, 62') connected unitarily with each other along the area of the mold separation line located at the intermediate plane (24).

5. The fluid tank according to claim 1, wherein the coupling rims are bordered towards the through hole (70, 70'; 72, 72') by conically in each other engaging plug connectors or stand pipes (78, 78'; 80, 80').

6. The fluid tank according to claim 1, wherein the through holes (70, 70'; 72, 72') and the coupling rims (74, 74'; 76, 76') exhibit a circular contour.

7. The fluid tank according to claim 1, wherein a sealing ring (82; 84) of elastomeric material is provided between the two coupling rims (74, 74'; 76, 76').

8. The fluid tank according to claim 1, wherein boreholes (88, 90) are provided in the area of the coupling rims, spaced apart from each other, pair-wise aligned with each other, said boreholes being adapted for the passage through of connecting screws (86).

9. The fluid tank according to claim 8, wherein the boreholes (88) of the base section (26) are provided with internal threadings for engagement with the connecting screws (86).

10. The fluid tank according to claim 1, wherein the dome section (28) and the base section (26) are screwed together with each other in the area of the coupling rims.

11. A fluid tank with
a base section (26) defined by a tank floor (22) and an intermediate plane (24) situated a distance above the tank floor (22), and
a domed section (28), situated above the intermediate plane (24) and communicating with the base section (26),
wherein the base section (26) and the dome section (28) are in the form of separate hollow sections,
wherein the base section is at least partially covered over by a cover (64) above the intermediate plane (24),
wherein the dome section (28) includes on its lower side a dome section floor (66),
wherein the dome section (28) is seatable with its dome section floor (66) upon the cover (64) of the base section (26),
wherein the cover (64) of the base section (26) and the dome section floor (66) of the dome section (28) respectively are provided with at least one through hole (70, 70'; 72, 72') which pair-wise align with each other to form a through opening and which are bordered by coupling rims (74, 74'; 76, 76') engaging form-fitting in each other,
wherein the complimentarily coupling rims (74, 76; 74', 76') adapted to mating engagement, are channeled grooved, are formed into the cover (64) of the base section (26) and the dome section floor (66) of the dome section (28),
wherein the coupling rims are bordered towards the through hole (70, 70'; 72, 72') by conically in each other engaging plug connectors or stand pipes (78, 78'; 80, 80'),
wherein the through holes (70, 70'; 72, 72') and the coupling rims (74, 74'; 76, 76') exhibit a circular contour,
wherein a sealing ring (82; 84) of elastomeric material is provided between the two coupling rims (74, 74'; 76, 76'),
wherein boreholes (88, 90) are provided in the area of the coupling rims, spaced apart from each other, pair-wise aligned with each other, and the boreholes (88) of the base section (26) are provided with internal threadings for engagement with the connecting screws (86), and
Wherein then dome section (28) includes a cover (50) opposite the floor (66), and wherein said cover (50) is provided with a lockable assembly opening (52, 54) aligned with the through holes (70', 72') on the floor.

12. The fluid tank according to claim 11, wherein the dome section (28) and the base section (26) are screwed together with each other in the area of the coupling rims.

13. The fluid tank according to claim 11, wherein the sealing ring (82, 84) is provided with boreholes spaced apart from each other circumferentially for the passage through of connecting screws (86).

14. The fluid tank according to claim 11, further comprising at least one tower part (30) projecting above the base section (26), communicating with the dome section (28) via the internal space of the base section (26).

15. The fluid tank according to claim 14, wherein the dome section (28) and the tower part (30) are provided spaced apart from each other maintaining free an upwardly open intermediate space (92).

16. A mobile work machine comprising a fluid tank according to claim 15, wherein said tank is adapted for use as a water tank for mobile concrete pumps, wherein a concrete delivery pipe (16) extends through a space (92) between the dome section (28) and the tower part (30) of the water tank.

17. The fluid tank according to claim 14, wherein the tower part (30) is connected unitarily with the base section (26).

18. The fluid tank according to claim 11, wherein niches (34, 34') formed from outside into the side walls (32) of the base section (26), in the corner areas, which from the floor side are bounded by integral mounting lips (36) or plates (38).

19. The fluid tank according to claim 11, wherein reinforcing strips (42) are formed in at least one of the tank floor (22), the side walls (32) of the base section (26) and the dome section (28).

20. The fluid tank according to claim 11, wherein the base section (26) includes a downwardly directed drainage sump with a drainage stand pipe or connector (46).

21. A mobile work machine comprising a fluid tank according to claim 11, wherein said tank is adapted for use as a water tank for a mobile work machine.

* * * * *